US009097193B2

(12) United States Patent
Oda et al.

(10) Patent No.: US 9,097,193 B2
(45) Date of Patent: Aug. 4, 2015

(54) INTER-CYLINDER AIR-FUEL RATIO VARIATION ABNORMALITY DETECTION APPARATUS FOR MULTICYLINDER INTERNAL COMBUSTION ENGINE

(71) Applicants: Yoshihisa Oda, Toyota (JP); Isao Nakajima, Nisshin (JP); Masashi Hakariya, Nagoya (JP); Akihiro Katayama, Toyota (JP); Kazuhiro Akisada, Toyota (JP); Sei Maruta, Toyota (JP); Leuth Insixiengmai, Nagoya (JP); Shinichi Nakagoshi, Nisshin (JP); Masahide Okada, Anjo (JP)

(72) Inventors: Yoshihisa Oda, Toyota (JP); Isao Nakajima, Nisshin (JP); Masashi Hakariya, Nagoya (JP); Akihiro Katayama, Toyota (JP); Kazuhiro Akisada, Toyota (JP); Sei Maruta, Toyota (JP); Leuth Insixiengmai, Nagoya (JP); Shinichi Nakagoshi, Nisshin (JP); Masahide Okada, Anjo (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 96 days.

(21) Appl. No.: 14/044,400

(22) Filed: Oct. 2, 2013

(65) Prior Publication Data

US 2014/0095053 A1 Apr. 3, 2014

(30) Foreign Application Priority Data

Oct. 3, 2012 (JP) ................................ 2012-221463

(51) Int. Cl.

*B60T 7/12* (2006.01)
*F02D 41/14* (2006.01)
*F02D 41/00* (2006.01)

(52) U.S. Cl.

CPC ........ *F02D 41/1454* (2013.01); *F02D 41/0082* (2013.01); *F02D 41/0085* (2013.01); *F02D 41/1497* (2013.01); *F02D 41/1441* (2013.01)

(58) Field of Classification Search

CPC ............ F02D 41/0085; F02D 41/0082; F02D 41/0087; F02D 41/1498; F02D 41/1454; F02D 41/14; F02D 41/08; G01M 15/046

USPC ................. 701/103, 104, 110, 111, 105, 106; 123/435, 436, 406.24, 406.58, 123/672–675, 690–692, 687, 688, 703, 123/486; 73/35.09, 114.03, 114.04, 114.07, 73/114.25, 114.26, 114.27, 23.32, 114.49

See application file for complete search history.

(56) References Cited

U.S. PATENT DOCUMENTS 4,348,893 A * 9/1982 Hendrix et al. ............ 73/114.22
4,495,920 A * 1/1985 Matsumura et al. .......... 123/436

(Continued)

FOREIGN PATENT DOCUMENTS

GB 2355814 A * 5/2001 ................ F02D 9/00
JP 2010-112244 A 5/2010
JP 2011-196195 A 10/2011

*Primary Examiner* — Stephen K Cronin
*Assistant Examiner* — Brian Kirby
(74) *Attorney, Agent, or Firm* — Gifford, Krass, Sprinkle, Anderson & Citkowski, P.C.

(57) ABSTRACT

An inter-cylinder air-fuel ratio variation abnormality detection apparatus is disclosed. The apparatus determines imbalance of an air-fuel ratio among the cylinders based on a difference between index values correlated with crank angular velocities detected in a set of opposite cylinders belonging to different banks and having crank angles different from one another by 360°; and carries out an air-fuel ratio feedback process for controlling an amount of injected fuel for each of the banks, wherein the apparatus comprises a correction unit correcting, before determining the air-fuel ratio imbalance, the difference between the index values in a direction of combustion improvement for opposite cylinders that are opposite to cylinders belonging to a bank identical to a bank of a cylinder with the most deviating index value from a standard value among all the cylinders and being other than the cylinder with the most deviating index value.

3 Claims, 12 Drawing Sheets

(56) References Cited

U.S. PATENT DOCUMENTS 4,532,592 A * 7/1985 Citron et al. .................. 701/105
4,697,561 A * 10/1987 Citron ...................... 123/339.14
4,700,681 A * 10/1987 Hanafusa et al. ............ 123/478
4,883,038 A * 11/1989 Nakaniwa ..................... 123/436
5,016,591 A * 5/1991 Nanyoshi et al. .......... 123/406.2
5,341,788 A * 8/1994 Uchida ......................... 123/692
5,728,941 A * 3/1998 Yamamoto et al. ........ 73/114.04
5,740,780 A * 4/1998 Shimizu et al. .......... 123/406.22
5,832,404 A * 11/1998 Amano ......................... 701/110
5,950,603 A * 9/1999 Cook et al. .................... 123/520
6,209,520 B1 * 4/2001 Kolmanovsky et al. ...... 123/435
6,712,042 B1 * 3/2004 Kustosch ................. 123/406.23
6,843,214 B1 * 1/2005 Herrin ........................ 123/90.15
7,027,910 B1 * 4/2006 Javaherian et al. ........... 701/111
7,779,802 B2 * 8/2010 Russ .......................... 123/90.17
7,877,192 B2 * 1/2011 Shikama et al. .............. 701/111
8,051,704 B2 * 11/2011 Kim et al. .................. 73/114.49
8,459,105 B2 * 6/2013 Kim et al. .................. 73/114.49
8,676,477 B2 3/2014 Nagakura et al.
2007/0078586 A1 * 4/2007 Pallett et al. .................. 701/101
2007/0261669 A1 * 11/2007 Buslepp et al. .......... 123/406.24
2008/0133111 A1 * 6/2008 Buslepp et al. ............... 701/103
2009/0018756 A1 * 1/2009 Storhok et al. ................ 701/105
2009/0259382 A1 * 10/2009 McKay et al. ................ 701/102
2010/0288035 A1 * 11/2010 Arakawa .................... 73/114.03
2012/0209497 A1 * 8/2012 Yoshikawa .................... 701/103

* cited by examiner

INTER-CYLINDER AIR-FUEL RATIO VARIATION ABNORMALITY DETECTION APPARATUS FOR MULTICYLINDER INTERNAL COMBUSTION ENGINE

CROSS-REFERENCES TO RELATED APPLICATIONS

This application claims the benefit of Japanese Patent Application No. 2012-221463, filed Oct. 3, 2012, which is hereby incorporated by reference herein in its entirety.

BACKGROUND OF THE INVENTION

1. Field of the Invention

The present invention relates to an apparatus for detecting variation abnormality in air-fuel ratio among cylinders of a multicylinder internal combustion engine, and in particular, to an apparatus suitably applicable to an internal combustion engine with a plurality of banks.

2. Description of the Related Art

In general, an internal combustion engine with an exhaust purification system utilizing a catalyst efficiently removes harmful exhaust components using the catalyst, and thus needs to control the mixing ratio between air and fuel in an air-fuel mixture combusted in the engine. To control the air-fuel ratio, an air-fuel ratio sensor is provided in an exhaust passage in the engine to perform feedback control to make the detected air-fuel ratio equal to a predetermined air-fuel ratio.

On the other hand, a multicylinder internal combustion engine normally controls the air-fuel ratio using the same control variables for all cylinders. Thus, even when the air-fuel ratio control is taken place, the actual air-fuel ratio may vary among the cylinders. In this case, a small variation can be absorbed by the air-fuel ratio feedback control, and the catalyst also serves to remove harmful exhaust components. Consequently, such a small variation is prevented from affecting exhaust gas emission and from posing no obvious problem.

However, if, for example, fuel injection systems for some cylinders fail to significantly vary the air-fuel ratio among cylinders, the exhaust gas emission disadvantageously deteriorates. Such a significant variation in air-fuel ratio, as it degrades the exhaust gas emission, is desirably detected as an abnormality. In particular, for automotive internal combustion engines, there has been a demand to detect variation abnormality in air-fuel ratio among the cylinders in a vehicle-mounted state (what is called OBD: On-Board Diagnostics) in order to prevent a vehicle with deteriorated exhaust gas emission from travelling. Attempts have recently been made to legally obligate the on-board abnormally detection.

For example, an apparatus described in Japanese Patent Laid-Open No. 2010-112244, upon determining that any cylinder has an abnormal air-fuel ratio, identifies the abnormal cylinder by decrementing the duration of injection of fuel into each cylinder by a predetermined value until the cylinder with an abnormal air-fuel ratio misfires.

In the meantime, when a variation in air-fuel ratio among the cylinders is detected based on the angular velocity of a crank shaft, rotation of a timing rotor fixed to the crank shaft is detected by a crank angle sensor. However, a product variation among timing rotors may vary the position, in a rotating direction, of each of a large number of projections formed on a circumferential surface of the timing rotor.

In view of the above-described circumstances, it is an object of the present invention to suppress a detection error caused by a product variation among timing rotors, improving detection accuracy.

SUMMARY OF THE INVENTION

To achieve the above-described object, an aspect of the present invention provides an inter-cylinder air-fuel ratio variation abnormality detection apparatus for a multicylinder internal combustion engine having a plurality of cylinders connected to a common crank shaft and forming a plurality of banks, the apparatus comprising:

an imbalance determination unit determining imbalance of an air-fuel ratio among the cylinders based on a difference between index values correlated with crank angular velocities detected in a set of opposite cylinders belonging to different banks and having crank angles different from one another by 360°; and an air-fuel ratio feedback processing unit carrying out an air-fuel ratio feedback process for controlling an amount of injected fuel for each of the banks so as to make the air-fuel ratio equal to a predetermined target air-fuel ratio, wherein the apparatus further comprises a correction unit correcting, before determining the air-fuel ratio imbalance, the difference between the index values in a direction of combustion improvement for opposite cylinders that are opposite to cylinders belonging to a bank identical to a bank of a cylinder with an index value deviating most from a standard value among all the cylinders and being other than the cylinder with the most deviating index value.

Preferably, a correction amount for the correction is changed in accordance with the index value of a cylinder which deviates most from the standard value among all the cylinders.

Preferably, the correction amount for the correction increases consistently with an absolute value of the difference between the index values for a cylinder which deviates most from the standard value among all the cylinders.

Further features of the present invention will become apparent from the following description of exemplary embodiments (with reference to the attached drawings).

DESCRIPTION OF THE EMBODIMENTS

Embodiments of the present invention will be described.

Figure 1:
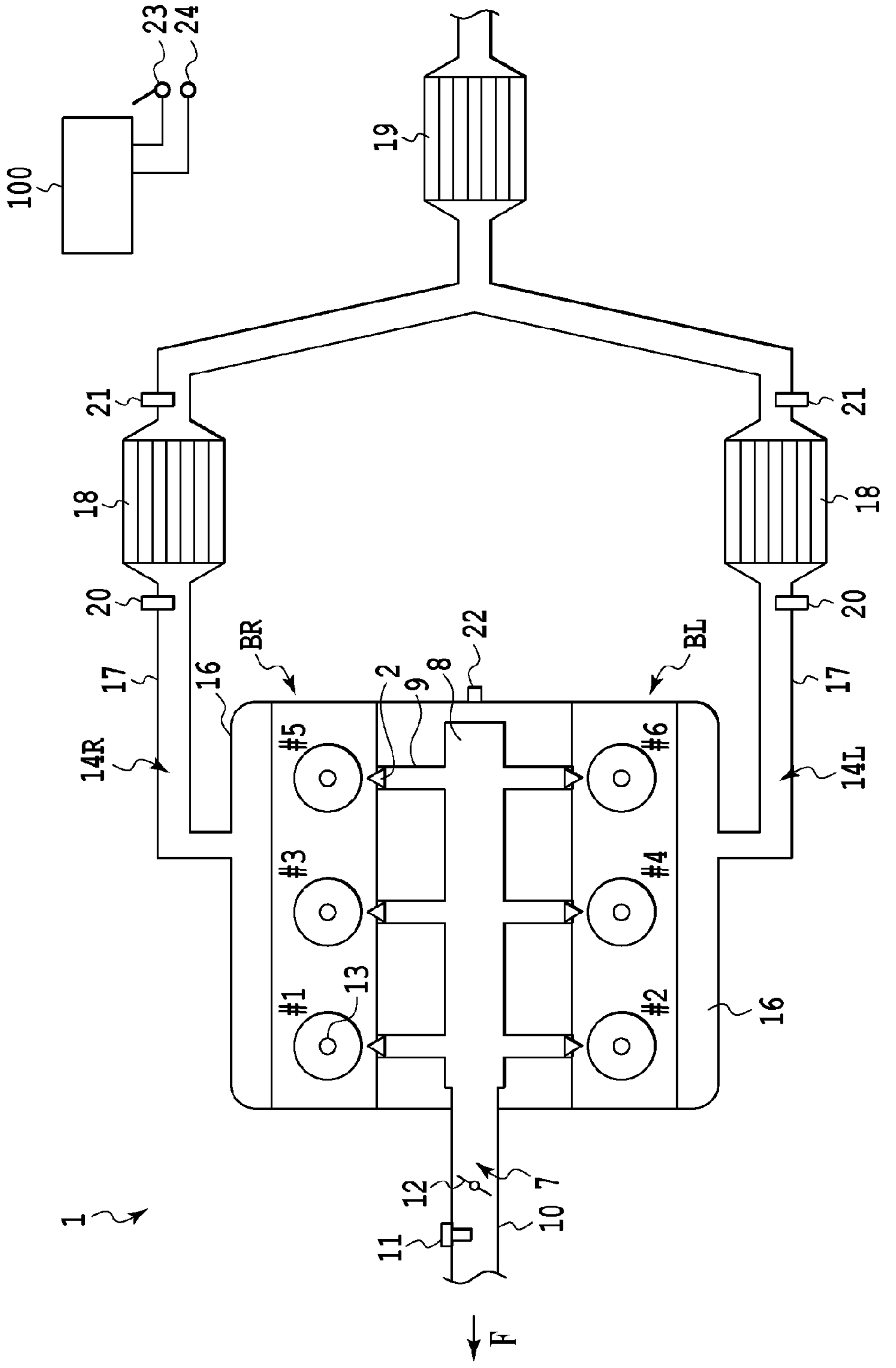
FIG. 1 is a schematic diagram of an internal combustion engine according to a first embodiment of the present invention.

FIG. 1 schematically shows an internal combustion engine according to a first embodiment. An illustrated internal combustion engine 1 is a V6 4-cycle spark ignition internal combustion engine (gasoline engine) mounted in a car. The engine 1 has a right bank BR located on a right side and a left bank BL located on a left side as viewed in a forward direction F. The right bank includes odd-numbered cylinders, namely, #1, #3, and #5 cylinders, arranged in this order. The left bank includes even-numbered cylinders, namely, #2, #4, and #6 cylinders, arranged in this order.

An injector (fuel injection valve) 2 is provided for each of the cylinders. The injector 2 injects fuel into an intake passage in the corresponding cylinder, and particularly into an intake port (not shown). Each of the cylinders includes an ignition plug 13 for igniting an air-fuel mixture in the cylinder.

The intake passage 7 for introducing intake air includes, besides the intake port, a surge tank 8 serving as an aggregation section, a plurality of intake manifolds 9 connecting the intake port of each cylinder to the surge tank 8, and an intake pipe 10 located upstream of the surge tank 8. The intake pipe 10 includes an air flow meter 11 and an electronic control throttle valve 12 arranged in this order from the upstream side. The air flow meter 11 outputs a signal of a magnitude corresponding to an intake flow rate.

A right exhaust passage 14R is provided for the right bank BR. A left exhaust passage 14L is provided for the left bank BL. The right exhaust passage 14R and the left exhaust passage 14L are joined together on an upstream side of a downstream catalyst 19. The configuration of an exhaust system located upstream of the junction position is the same for both banks. Therefore, only the right bank BR is hereinafter described, and the description of the left bank BL is omitted; in the figures, the left bank BL is denoted by the same reference numerals as those for the right bank BR.

The right exhaust passage 14R includes exhaust ports (not shown in the drawings) for the #1, #3, and #5 cylinders, an exhaust manifold 16 that aggregates exhaust gas from the exhaust ports, and an exhaust pipe 17 installed downstream of the exhaust manifold 16. An upstream catalyst 18 is provided in the exhaust pipe 17. A pre-catalyst sensor 20 and a post-catalyst sensor 21 are installed upstream and downstream (immediately before and immediately after), respectively, of the upstream catalyst 18; both the pre-catalyst sensor 20 and the post-catalyst sensor 21 are air-fuel ratio sensors that detect the air-fuel ratio of exhaust gas. Thus, one upstream catalyst 18, one pre-catalyst sensor 20, and one post-catalyst sensor 21 are provided for the plurality of cylinders (or a group of cylinders) belonging to one bank. The right and left exhaust passages 14R and 14L can be provided with a individual downstream catalyst 19, respectively, without being joined together.

Moreover, the engine 1 is provided with an electronic control unit (hereinafter referred to as an ECU) 100 serving as a control unit and a detection unit. The ECU 100 includes a CPU, a ROM, a RAM, an I/O port, and a nonvolatile storage device. The ECU 100 connects electrically to, besides the above-described air flow meter 11, pre-catalyst sensor 20, and post-catalyst sensor 21, a crank position sensor 22 for detecting the crank angle and position of the engine 1, an accelerator opening degree sensor 23 for detecting an accelerator opening degree, a coolant temperature sensor 24 for detecting the temperature of an engine coolant, and various other sensors, via A/D converters or the like (not shown). Based on, for example, detection values from the sensors, the ECU 100 controls the injectors 2, the ignition plugs 13, the throttle valve 12, and the like as well as the amount of injected fuel, a fuel injection timing, an ignition timing, a throttle opening degree, and the like, so as to obtain a desired output.

Figure 3:
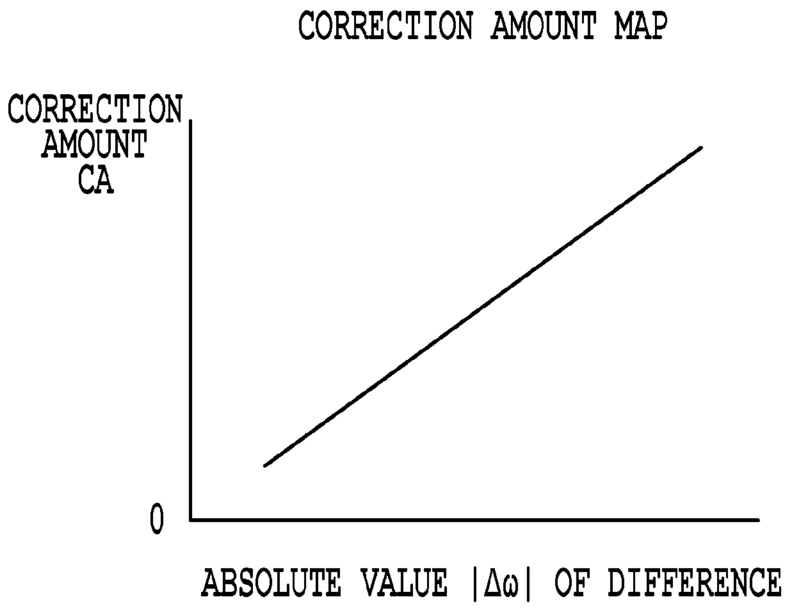
FIG. 3 is a graph showing an example of setting of a correction amount map according to a first embodiment.

The ROM of the ECU 100 stores a correction amount map for determining a correction amount used for a correction process described below. As shown in FIG. 3, the correction amount map stores the absolute value |Δω| of the difference Δω of an index value and a correction amount CA for correcting the difference Δω of the index value, in association with each other, wherein the difference Δωbeing a difference of a crank angular velocity ω of a cylinder deviating most from a standard value ωN among all cylinders, and the crank angular velocity serving as an index value described below. The correction amount CA increases consistently with the absolute value |Δω| of the difference Δω of the index value (crank angular velocity ω) of the above-described cylinder which deviates most from the standard value ωN among all the cylinders.

The throttle valve 12 includes a throttle opening degree sensor (not shown) so that a signal from the throttle opening degree sensor is transmitted to the ECU 100. The ECU 100 controls, by feedback, the opening degree of the throttle valve 12 to an opening degree determined depending on the accelerator opening degree. Furthermore, the ECU 100 detects the amount of intake air per unit time, that is, the intake air amount, based on a signal from the air flow meter 11. The ECU 100 detects loads on the engine 1 based on at least one of the detected accelerator opening degree, throttle opening degree, and intake air amount.

The ECU 100 detects the crank angle itself and the rotation speed of the engine 1, based on a crank pulse signal from the crank position sensor 22. The "number of rotations" as used herein refers to the number of rotations per unit time and is used synonymously with the rotation speed.

Figure 2:
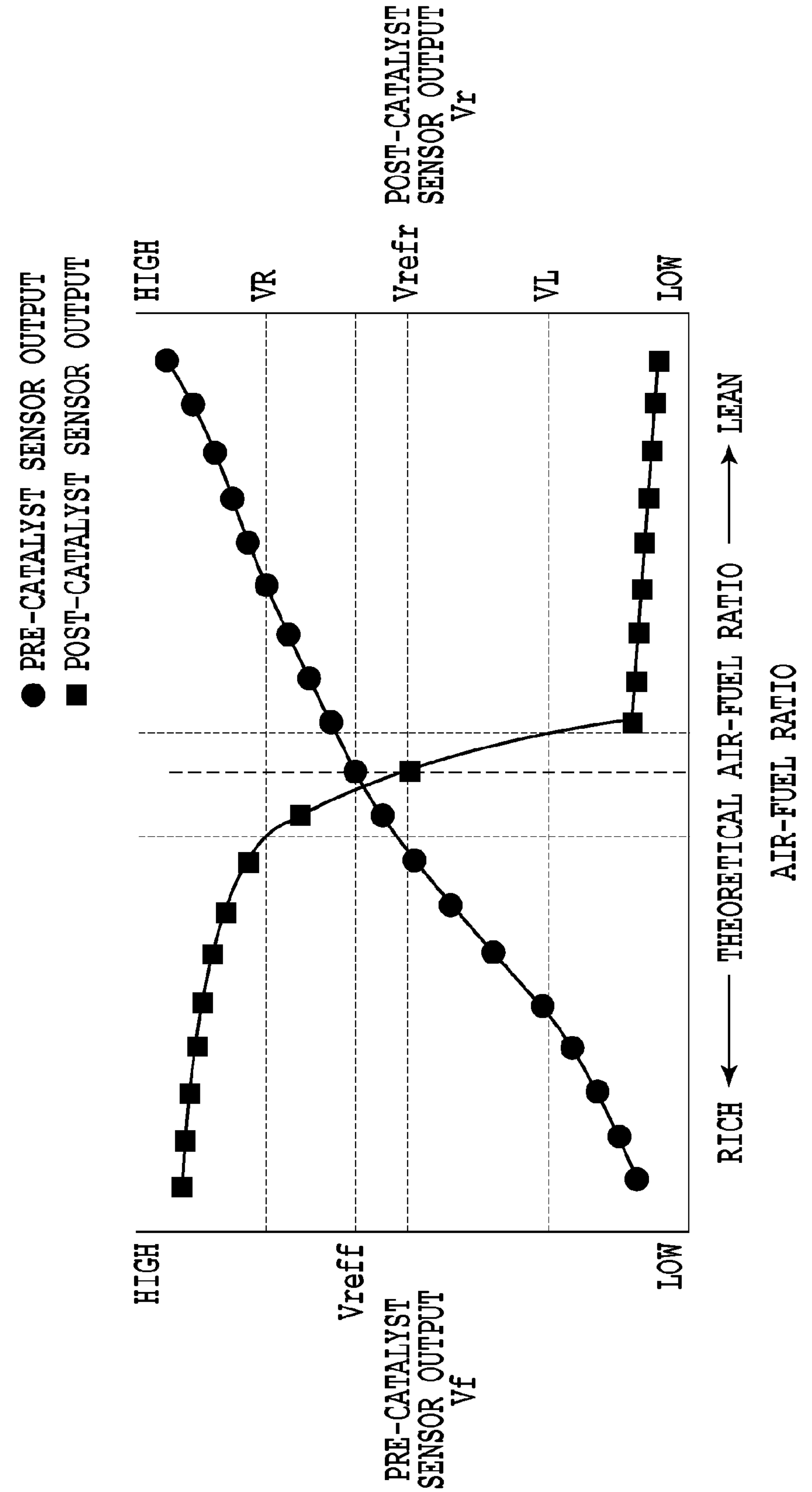
FIG. 2 is a graph showing output characteristics of a pre-catalyst sensor and a post-catalyst sensor.

The pre-catalyst sensor 20 includes what is called a wide-range air-fuel ratio sensor and can consecutively detect a relatively wide range of air-fuel ratios. FIG. 2 shows the output characteristics of a pre-catalyst sensor 20. As shown in FIG. 2, the pre-catalyst sensor 20 outputs a voltage signal Vf of a magnitude proportional to a detected exhaust air-fuel ratio (pre-catalyst air-fuel ratio A/Ff). An output voltage obtained when the exhaust air-fuel ratio is stoichiometric (a theoretical air-fuel ratio, for example, A/F=14.5) is Vreff (for example, about 3.3 V).

On the other hand, the post-catalyst sensor 21 includes what is called an O2 sensor and is characterized by an output value changing abruptly when the air-fuel ratio changes across the stoichiometric ratio. FIG. 2 shows the output characteristics of the post-catalyst sensor. As shown in FIG. 2, an output voltage obtained when the exhaust air-fuel ratio (post-catalyst air-fuel ratio A/Fr) is stoichiometric, that is, a stoichiometric equivalent value is Vreff (for example, 0.45 V). The output voltage of the post-catalyst sensor 21 varies within a predetermined range (for example, from 0 V to 1 V). In general, when the exhaust air-fuel ratio is generally leaner than the stoichiometric ratio, the output voltage Vr of the post-catalyst sensor is lower than the stoichiometric equivalent value Vrefr. When the exhaust air-fuel ratio is richer than the stoichiometric ratio, the output voltage Vr of the post-catalyst sensor is higher than the stoichiometric equivalent value Vrefr.

Each of the upstream catalyst 18 and the downstream catalyst 19 includes a three-way catalyst. When the air-fuel ratio A/F of exhaust gas flowing into one of the upstream catalyst 18 and the downstream catalyst 19 is close to the stoichiometric ratio, the catalyst simultaneously removes NOx, HC, and CO, which are harmful exhaust components, from the exhaust gas. The range (i.e. window) of the air-fuel ratio within which the three components can be efficiently removed is relatively narrow.

Thus, during a normal operation of the engine, the ECU 100 performs feedback control (stoichiometric control) for controlling the air-fuel ratio of exhaust gas flowing into the upstream catalyst 18 to a value close to the stoichiometric ratio. The air-fuel ratio feedback control includes main air-fuel ratio control and supplementary air-fuel ratio control. In the main air-fuel ratio control (main air-fuel ratio feedback control), the air-fuel ratio of an air-fuel mixture (specifically, the amount of injected fuel) is feedback controlled so that the exhaust air-fuel ratio detected by the pre-catalyst sensor 20 is equal to the stoichiometric ratio, which is a target air-fuel ratio. In the supplementary air-fuel ratio control, the air-fuel ratio of an air-fuel mixture (specifically, the amount of injected fuel) is feedback controlled so that the exhaust air-fuel ratio detected by the post-catalyst sensor 21 is equal to the stoichiometric ratio.

Thus, in the first embodiment, a reference value for the air-fuel ratio is the stoichiometric ratio, and the amount of injected fuel corresponding to the stoichiometric ratio (referred to as the stoichiometric-equivalent amount) is a reference value for the amount of injected fuel. However, different reference values can be used for the air-fuel ratio and the amount of injected fuel.

The air-fuel ratio feedback control is performed for each bank, that is, in units of banks. For example, detection values from the pre-catalyst sensor 20 and the post-catalyst sensor 21 on the right bank BR are used only for the air-fuel ratio feedback control of the #1, #3, and #5 cylinders belonging to the right bank BR and are not used for the air-fuel ratio feedback control of the #2, #4, and #6 cylinders belonging to the left bank BL, and vice versa. The air-fuel ratio control is performed in a manner as if the air-fuel ratio control is performed on two independent, straight-three cylinder engines. Furthermore, in the air-fuel ratio feedback control, the same control amount is equally used for the cylinders belonging to the same bank.

Figure 4:
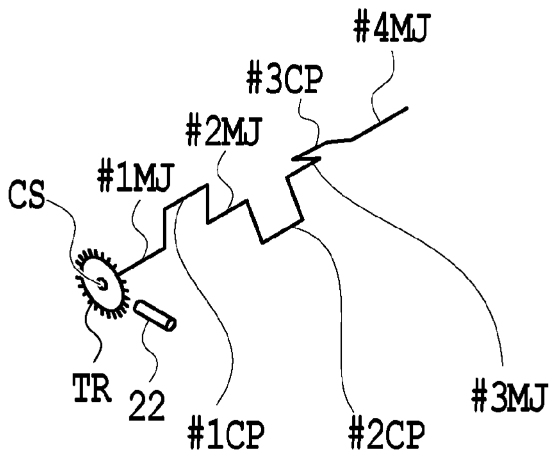
FIG. 4 is a schematic diagram showing an example of a crank shaft in the internal combustion engine according to the first embodiment.

As shown in FIG. 4, the V6 engine 1 according to the first embodiment has a crank shaft CS including four main journals, i.e. #1 to #4 journals (#1MJ to #4MJ), and three crank pins (#1CP to #3CP) each disposed between the main journals and between crank throws. On the crank shaft CS, a phase difference of 120° is present between the #1 and #2 crank pins (#1CP and #2CP) with respect to a crank center. A phase difference of 120° is present between the #2 and #3 crank pins (#2CP and #3CP) with respect to the crank center. Large ends of connecting rods of the cylinders #1 and #2 are connected to the crank pin #1CP of the cylinder #1. Similarly, large ends of connecting rods of the cylinders #3 and #4 are connected to the #2 crank pin #2CP, and large ends of connecting rods of the cylinders #5 and #6 are connected to the #3 crank pin #3CP. Furthermore, on the crank shaft CS, a timing rotor TR with 34 projections corresponding to teeth and provided at intervals of 10° and two missing teeth is installed in front of the main journal #1MJ. A crank position sensor 22 of an electromagnetic pickup type is positioned in a facing relation with the projections of the timing rotor TR.

In the engine 1 with the above-described cylinder arrangement, ignition is carried out, for example, in the following order of the cylinders: #1, #2, #3, #4, #5, #6. In the engine as a whole, ignition is carried out at even intervals of 120° CA.

The ignition relation between the #1, #3, and #5 cylinders in the right bank BR and the #4, #6, and #2 cylinders in the left bank BL is such that the #4, #6, and #2 cylinders in the left bank BL are ignited when the crank shaft makes one rotation, that is, when the crank shaft rotates through 360° CA, after the #1, #3, and #5 right bank cylinders are ignited, respectively. Thus, the #1 and #4 cylinders, the #3 and #6 cylinders, and the #5 and #2 cylinders are sets of "opposite cylinders" according to the present invention.

The injector 2 may fail in some of all the cylinders (particularly one cylinder), causing a variation (imbalance) in air-fuel ratio among the cylinders. For example, in the right bank BR, nozzle hole blockage or incomplete valve opening in the injector 2 may make the amount of injected fuel smaller in the #1 cylinder than in the other, #3 and #5 cylinders, causing the air-fuel ratio in the #1 cylinder to deviate more toward a lean side than the air-fuel ratios in the #3 and #5 cylinders.

Even in this case, the air-fuel ratio of total gas (exhaust gas having passed through the junction) supplied to the pre-catalyst sensor 20 may be controlled to the stoichiometric ratio by applying a relatively large correction amount through the above-described feedback control. However, in this case, the air-fuel ratio in the #1 cylinder is much leaner than the stoichiometric ratio, and the air-fuel ratios in the #3 and #5 cylinders are richer than the stoichiometric ratio. Thus, the air-fuel ratio is stoichiometric only in terms of total balance, and this is apparently not preferable in terms of emissions. Accordingly, the first embodiment includes an apparatus that detects such variation abnormality in air-fuel ratio among the cylinders according to the first embodiment.

The inter-cylinder air-fuel ratio variation abnormality detection according to the first embodiment is based on a variation in the rotation of the crank shaft CS. If the air-fuel ratio in any cylinder deviates significantly toward the lean side, torque resulting from combustion is lower than in the stoichiometric air-fuel ratio, leading to a reduced angular velocity (crank angular velocity $\omega$) of the crank shaft CS. This can be utilized to detect inter-cylinder air-fuel ratio variation abnormality based on the crank angular velocity $\omega$. Similar abnormality detection may be carried out using another parameter (for example, a rotation time T which is the time required to rotate through a predetermined crank angle) correlated with the crank angular velocity $\omega$.

In the meantime, when a variation in air-fuel ratio among the cylinders is detected based on the crank angular velocity $\omega$ or another parameter correlated thereto (for example, the rotation time T), the inter-cylinder air-fuel ratio variation abnormality is detected by detecting rotation of the timing rotor TR for a first cylinder by the crank position sensor 22, calculating the crank angular velocity $\omega$ for the first cylinder based on a time required for the rotation of the timing rotor TR through a predetermined angle, and comparing the determined crank angular velocity $\omega$ with the crank angular velocity $\omega$ for a second cylinder or calculating the difference in crank angular velocity $\omega$ between the first cylinder and the second cylinder. However, due to a product variation among timing rotors TR, misdetection may result from a variation in the position, in a rotating direction, of each of a large number of projections formed on a circumferential surface of the timing rotor TR.

Figure 5:
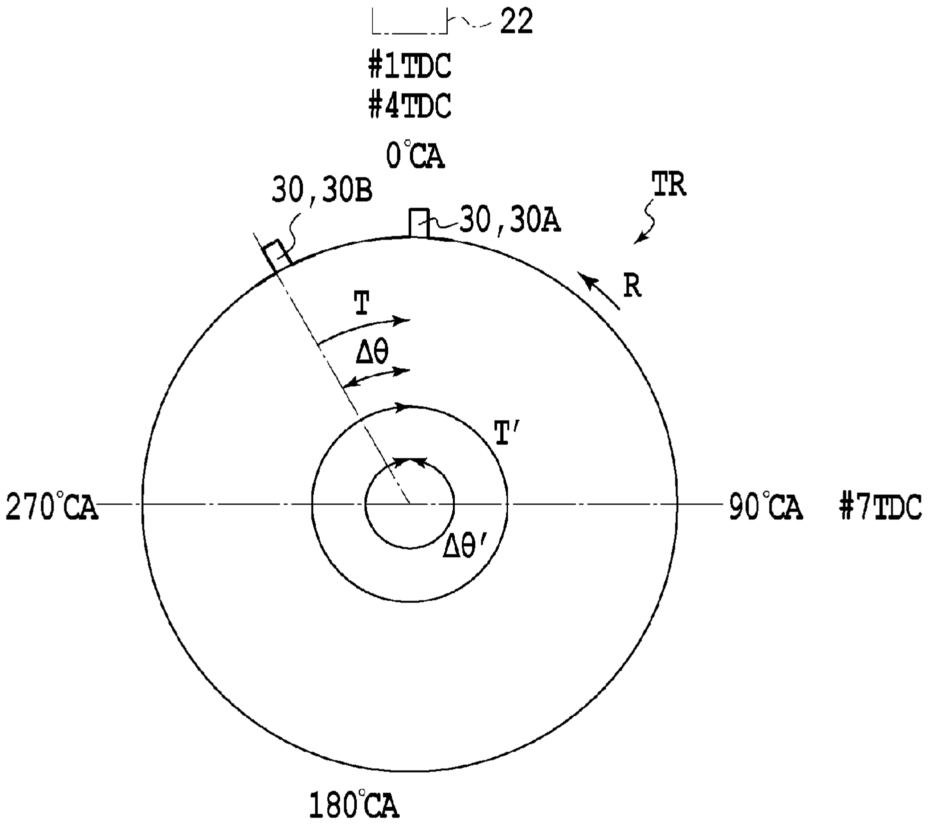
FIG. 5 is a diagram illustrating a timing rotor and a method for detecting a variation of rotation according to the first embodiment.

For example, FIG. 5 shows the position of the timing rotor TR observed when the crank angle lies at a TDC of the #1 cylinder. The rotating direction of the timing rotor TR is denoted by R, and the crank position sensor 22 is shown in phantom. At this position of the timing rotor TR, the crank position sensor 22 detects a tooth or a projection 30A corresponding to the TDC of the #1 cylinder. For convenience, the position of the projection 30A is assumed to be a reference, that is, 0° CA. When of rotation time T (s) at the TDC of the #1 cylinder is detected, the rotation time T at the TDC of the #1 cylinder is assumed to be a duration from the time when a projection 30B located a predetermined angle $\Delta\theta$=30° CA before a projection 30A is detected by the crank position sensor 22 to the time when the projection 30A is detected by the crank position sensor 22. A similar technique is used to detect the rotation time at a TDC of the #2 cylinder (subsequently ignited cylinder) which is located 120° CA subsequent to the TDC of the #1 cylinder. The rotation time at the TDC of the #1 cylinder is subtracted from the rotation time at the TDC of the #2 cylinder to detect the rotation time difference $\Delta T$ of the #1 cylinder.

However, according to this technique, the projection 30 used for detection to determine the rotation time T of the #1 cylinder is different from the projection 30 used for detection to determine the rotation time T of the #2 cylinder. Thus, due to a product variation among timing rotors TR, a variation in the position of each of the projections 30 may vary the value of the duration of rotation $\Delta T$ of each cylinder detected under the same conditions.

Thus, the first embodiment determines imbalance of the air-fuel ratio among the cylinders based on the difference between the index values correlated with the crank angular velocities detected in each of the three different sets of "opposite cylinders" belonging to different banks and having crank angles different from one another by 360°. That is, the detected rotation time T' [s] of the #1 cylinder corresponds to a duration from the time when the projection 30A is detected by the crank position sensor 22 to the time when the same projection 30A is detected by the crank position sensor 22 a predetermined angle $\Delta\theta$=360° CA (one rotation) after the initial detection. A crank angular velocity $\omega 1$ [rad/s] which is the reciprocal of the rotation time T' is defined as a rotation variation index value for the #1 cylinder. The same projection 30A observed 360° CA after the initial detection corresponds to the TDC of the #4 cylinder.

Thus, the first embodiment uses only one and the same projection 30A to detect the crank angular velocities $\omega 1$ and $\omega 4$. This eliminates the need to take into account a positional deviation of the projection 30A among products. Only three projections 30 in total, separated from one another by 120° CA, are used to detect the crank angular velocities of all cylinders. This suppresses a variation in the detection value of the rotation variation index value caused by a product variation among timing rotors TR, enabling detection accuracy to be improved.

Operation of the first embodiment configured as thus described will be described. In the first embodiment, while the engine is normally operating, the ECU 100 continuously performs, in parallel, the above-described air-fuel ratio feedback control and the inter-cylinder air-fuel ratio variation abnormality detection.

Figure 6:
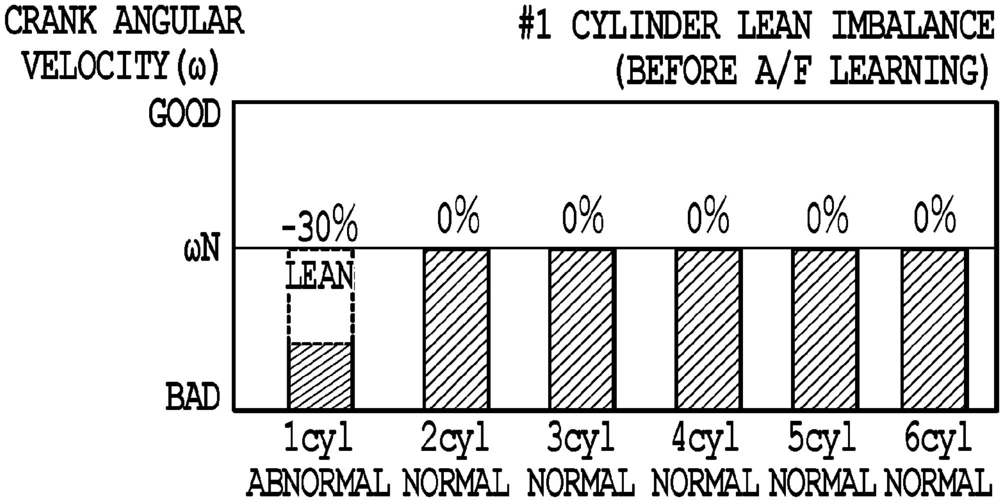
FIG. 6 is a graph showing a crank angular velocity of each cylinder observed when only a #1 cylinder has an air-fuel ratio deviating significantly toward a lean side.
Figure 7:
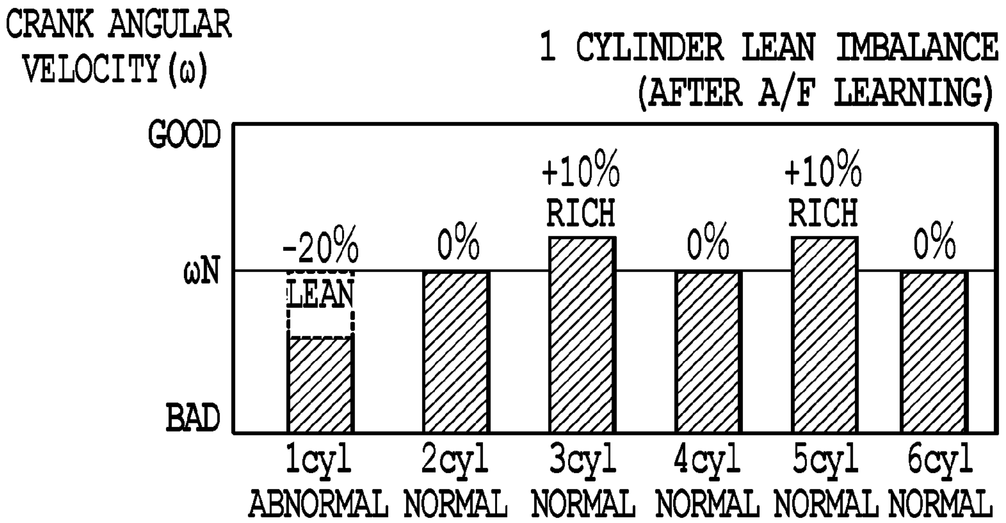
FIG. 7 is a graph showing the crank angular velocity of each cylinder observed when air-fuel ratio feedback control is performed in the state in FIG. 6.

It is assumed, for example, as shown in FIG. 6, that an air-fuel ratio of the #1 cylinder among of the #1 to #6 cylinders deviates significantly making its crank angler velocity to be −30%, for example, toward the lean side from a standard value $\omega N$ (according to the present embodiment, the stoichiometric-equivalent value). If the above-described air-fuel ratio feedback control is performed in this state, the air-fuel ratio feedback control is carried out for each bank as described above and the same control amount is equally applied to the cylinders belonging to the same bank (in this case, the #1, #3, and #5 cylinders, belonging to the right bank BR) to increase the amount of injected fuel. As a result, the #1 cylinder is set to a −20% lean state, and the #3 and #5 cylinders are set to a +10% rich state.

Figure 8:
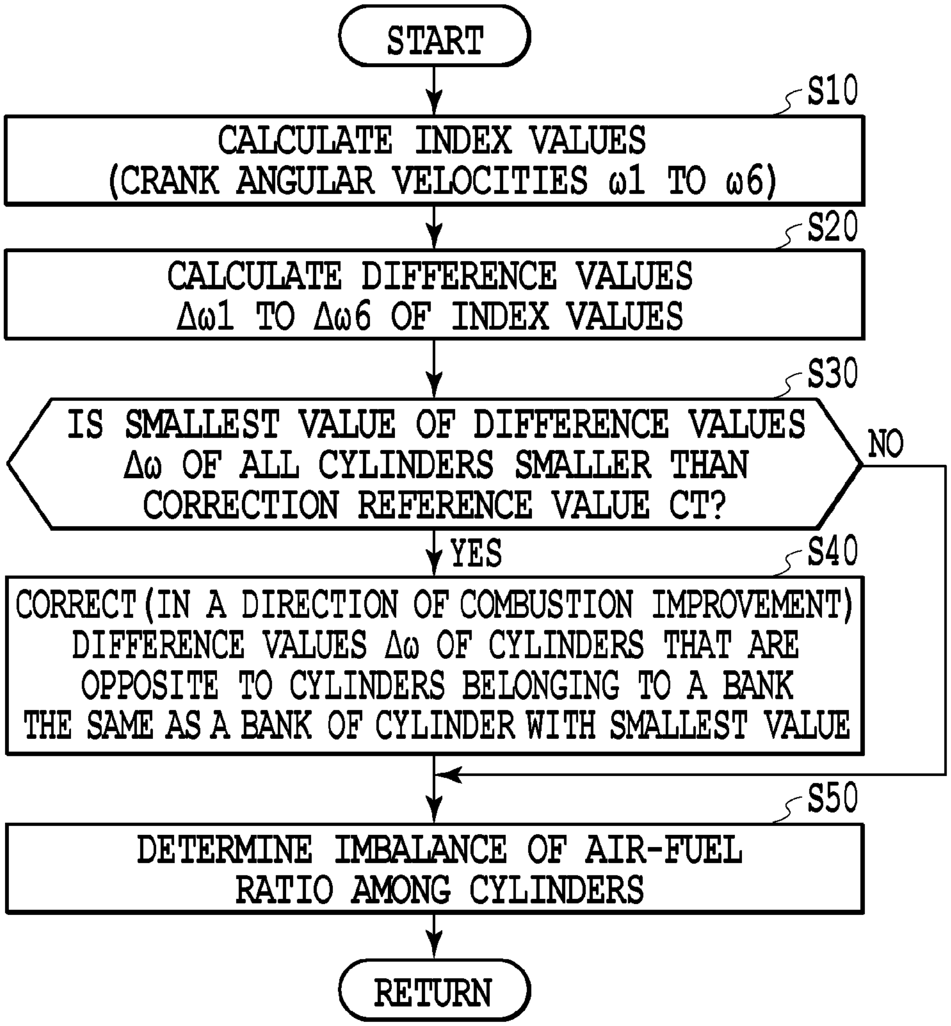
FIG. 8 is a flowchart showing a procedure for an inter-cylinder air-fuel ratio imbalance determination process according to the first embodiment.

An inter-cylinder air-fuel ratio variation abnormality detection process executed in such a state will be described below in detail. As shown in FIG. 8, first, the ECU 100 calculates, based on detection signals from the crank position sensor 22, the crank angular velocities $\omega 1$ to $\omega 6$ serving as index values for a variation of rotation, using the same projection 30 of the timing rotor TR as described above (S10). The crank angular velocities $\omega 1$ to $\omega 6$ are suitably calculated by, for example, averaging several tens of consecutive measured values.

Figure 9:
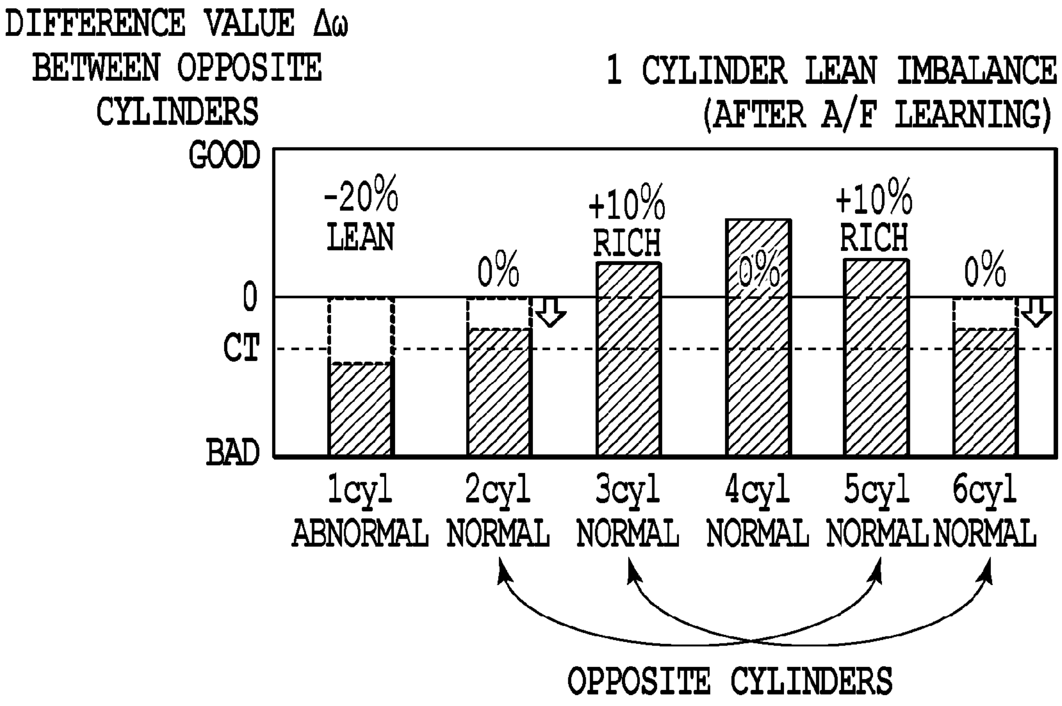
FIG. 9 is a graph showing the values of a difference in crank angular velocity between opposite cylinders calculated in the state in FIG. 7.

Then, the ECU 100 subtracts, from the crank angular velocity of the cylinder, the crank angular velocity of the opposite cylinder to calculate difference values $\Delta\omega 1$ to $\Delta\omega 6$ for the cylinders #1 to #6 (S20). The calculated "difference value" is the difference between the index values correlated with the crank angular velocities detected in each of the "opposite cylinders" as referred to in the present invention. The calculations carried out in step S20 are $\Delta\omega 1=\omega 1-\omega 4$, $\Delta\omega 2=\omega 2-\omega 5$, $\Delta\omega 3=\omega 3-\omega 6$, $\Delta\omega 4=\omega 4-\omega 1$, $\Delta\omega 5=\omega 5-\omega 2$, and $\Delta\omega 6=\omega 6-\omega 3$. Examples of the calculated difference values $\Delta\omega 1$ to $\Delta\omega 6$ are as shown in FIG. 9. The sets of opposite cylinders, that is, the #1 and #4 cylinders, the #3 and #6 cylinders, and the #5 and #2 cylinders each have symmetric values with respect to 0.

The ECU 100 then compares the smallest value of the difference values $\Delta\omega 1$ to $\Delta\omega 6$ with a predetermined correction reference value CT to determine whether the smallest value is smaller than the correction reference value (S30). In this example, the difference value $\Delta\omega 1$ is the smallest value as shown in FIG. 9 and is thus compared with the correction reference value CT. The difference value $\Delta\omega 1$ is smaller than the correction reference value CT and is thus determined in step S30 to be smaller than the correction reference value CT.

Figure 10:
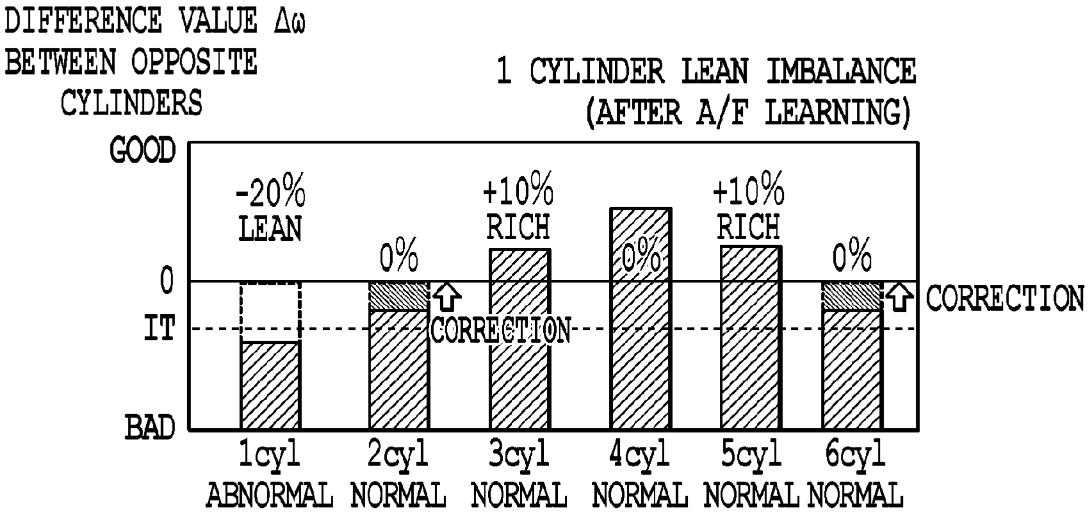
FIG. 10 is a graph showing the values of a difference in crank angular velocity between the opposite cylinders observed when correction is carried out in the state in FIG. 9.

When the smallest value is smaller than the correction reference value CT, the difference value $\Delta\omega$ is corrected for the "opposite cylinders" that are opposite to the cylinders belonging to the same bank as that of the cylinder with the smallest value and being other than the cylinder with the smallest value (S40). In this example, the difference values $\Delta\omega 6$ and $\Delta\omega 2$ are corrected for the "opposite cylinders" (#6 and #2 cylinders) that are opposite to the cylinders (#3 and #5 cylinders) belonging to the same bank as that of the cylinder (#1 cylinder) with the difference value $\Delta\omega 1$ and being other than the cylinder (#1 cylinder). In this example, the correction is carried out by calculating the correction amount CA in accordance with a correction amount map in FIG. 3 and adding the correction amount CA to the difference values $\Delta\omega 6$ and $\Delta\omega 2$, respectively. As described above, the correction amount increases consistently with the absolute value of the difference $\Delta\omega 1$ for the cylinder (in this example, the #1 cylinder) with an index value deviating most from the standard value $\omega N$ among all the cylinders (FIG. 3). In this example, as shown in FIG. 10, the difference values $\Delta\omega 6$ and $\Delta\omega 2$ are corrected, as a result of this correction, in a direction of combustion improvement (toward zero or the stoichiometric side). It should be noted that instead of the crank angular velocity ω, the rotation time T can be used to carry out the air-fuel ratio feedback correction, the inter-cylinder air-fuel ratio variation abnormality detection, and the inter-cylinder air-fuel ratio variation abnormality correction. In such a case, FIG. 6, FIG. 7, FIG. 9, and FIG. 10 would have shapes generally turned upside down.

With the difference values Δωcorrected, the ECU 100 then determines imbalance of the air-fuel ratio among the cylinders (S50). The determination is made depending on whether the difference value Δω is smaller than a predetermined abnormality determination reference value IT. The abnormality determination reference value IT may be the same as or different from the correction reference value CT.

When it is determined to be abnormal in step S50, for example, an alarm lamp provided on a front panel in a driver's cabin is turned on in order to inform the driver that inter-cylinder air-fuel ratio variation abnormality has been detected. Furthermore, information indicating that abnormality has been detected and the number of the abnormal cylinder are stored in a predetermined diagnosis memory area in the nonvolatile storage device in the ECU 100 so that the information and the number can be read out by a maintenance worker. This ends the variation abnormality detection control of FIG. 8.

It should be noted that in the first embodiment, the following are the cylinders subject to correction, i.e. the "opposite cylinders" that are opposite to the cylinders belonging to the same bank as that of the cylinder with the smallest value (hereinafter referred to as "the worst cylinder" as required) and being other than the cylinder with the smallest value.

Worst cylinder: #1, Other cylinders in the same bank: #3 and #5, Corrected cylinders: #6 and #2

Worst cylinder: #2, Other cylinders in the same bank: #4 and #6, Corrected cylinders: #1 and #3

Worst cylinder: #3, Other cylinders in the same bank: #5 and #1, Corrected cylinders: #2 and #4

Worst cylinder: #4, Other cylinders in the same bank: #6 and #2, Corrected cylinders: #3 and #5

Worst cylinder: #5, Other cylinders in the same bank: #1 and #3, Corrected cylinders: #4 and #6

Worst cylinder: #6, Other cylinders in the same bank: #2 and #4, Corrected cylinders: #5 and #1

As thus described, according to the first embodiment, the ECU 100 determines imbalance of the air-fuel ratio among the cylinders based on the difference Δω between the index values correlated with the crank angular velocities ω[rad/s] detected in at least one set of opposite cylinders. According to the first embodiment, the cylinders of the at least one set of the opposite cylinders have crank angles different from each other by 360°, and thus, the determination is made based on the detection of the same projection 30 of the timing rotor TR. Thus, misdetection caused by a production variation among timing rotors TR can be suppressed.

Furthermore, when the air-fuel ratio feedback process of controlling the amount of injected fuel is carried out on each bank, that is, each cylinder group, the feedback process changes the amount of injected fuel (for example, to a rich side) not only for the cylinder (an abnormal cylinder) with an index value (crank angular velocity ω) deviating most from the standard value ωN (for example, a lower crank angular velocity side or the lean side) among all the cylinders but also for the other cylinders belonging to the same bank as that of the abnormal cylinder. However, the change in the amount of injected fuel varies (for example, increases) the torque in the other cylinders. Thus, when the difference Δω in index value between the opposite cylinders is calculated during imbalance determination, the opposite cylinders opposite to the other cylinders may be erroneously determined to be abnormal, even though the air-fuel ratio, particularly the fuel injection system is not abnormal. Thus, before determining the air-fuel ratio imbalance, the first embodiment corrects the index value in the direction of combustion improvement (for example, toward a crank angular velocity increase side) for the opposite cylinders that are opposite to the cylinders belonging to the same bank as that of the cylinder with a crank angular velocity ω (being an index value) deviating most from the standard value ωN among all the cylinders and being other than the cylinder with the most deviating crank angular velocity ω. This allows suppression of an erroneous determination by an imbalance determination unit as a result of a change in the amount of injected fuel caused by the feedback process.

Further, according to the first embodiment, preferably, the correction amount used in the correction is changed according to the index value (crank angular velocity ω) of one cylinder which deviates most from the standard value ωN among all the cylinders. Thus, the appropriate correction value can be set correspondingly to the degree of a variation in air-fuel ratio.

Further, according to the first embodiment, the correction amount CA used in the correction increases consistently with the absolute value |Δω| of the difference Δω for the cylinder with an index value (crank angular velocity ω) deviating most from the standard value ωN. In general, an increase in the absolute value |Δω| of the difference Δω in index value between the abnormal cylinder and the opposite cylinder increases, the air-fuel ratio feedback correction amount for the cylinders belonging to the same bank as that of the abnormal cylinder and being other than the abnormal cylinder. Therefore, the appropriate correction amount can be set, by increasing the correction amount CA for the opposite cylinders opposite to the other cylinders consistently with the absolute value |Δω| of the difference Δω in index value between the abnormal cylinder and the opposite cylinder.

The first embodiment is configured to add, to the difference value Δω, the correction amount CA calculated using the correction amount map (FIG. 3) based on the absolute value |Δω| of the difference Δω. Instead of this configuration, another configuration may be used in which a correction factor is determined using a pre-created correction factor map based on the absolute value |Δω| of the difference Δω so that the difference value Δωcan be multiplied by the correction factor. In this case, the correction factor decreases with increasing absolute value |Δω| of the difference Δω (that is, in a graph representing the absolute value |Δω| on the axis of abscissas and the correction factor on the axis of ordinate, a curve of the correction factor extends diagonally right down so as to gradually approach zero).

Furthermore, the first embodiment has been described taking the engine 1 with two banks and 6 cylinders as an example. However, the present invention is similarly applicable to an engine with 2 banks and 8 cylinders. For example, when the engine has a right bank BR located on the right side and a left bank BL located on the left side as viewed in a forward direction F, the right bank BR includes odd-numbered cylinders, namely, a #1 cylinder, a #3 cylinder, a #5 cylinder, and a #7 cylinder, and the left bank BL includes even-numbered cylinders, namely, a #2 cylinder, a #4 cylinder, a #6 cylinder, and a #8 cylinder, correction target cylinders are as shown below. The cylinders are ignited in the following order: #1, #8, #7, #3, #6, #5, #4, and #2. The #1 and #6 cylinders, the #8 and #5 cylinders, the #7 and #4 cylinders, the #3 and #2 cylinders are sets of opposite cylinders according to the present invention.

Worst cylinder: #1, Other cylinders in the same bank: #3, #5, and #7, Corrected cylinders: #2, #8, and #4
Worst cylinder: #2, Other cylinders in the same bank: #4, #6, and #8, Corrected cylinders: #7, #1, and #5
Worst cylinder: #3, Other cylinders in the same bank: #1, #5, and #7, Corrected cylinders: #6, #8, and #4
Worst cylinder: #4, Other cylinders in the same bank: #2, #6, and #8, Corrected cylinders: #3, #1, and #5
Worst cylinder: #5, Other cylinders in the same bank: #1, #3, and #7, Corrected cylinders: #6, #2, and #4
Worst cylinder: #6, Other cylinders in the same bank: #2, #4, and #8, Corrected cylinders: #3, #7, and #5
Worst cylinder: #7, Other cylinders in the same bank: #1, #3, and #5, Corrected cylinders: #6, #2, and #8
Worst cylinder: #8, Other cylinders in the same bank: #2, #4, and #6, Corrected cylinders: #3, #7, and #1

Now, a second embodiment of the present invention will be described. According to the above-described first embodiment, if, for example, the #3 cylinder is processed, then a correction process needs to be carried out on the #2 and #4 cylinders at the same time. However, the second embodiment described below is intended to simplify this process.

Figure 11:
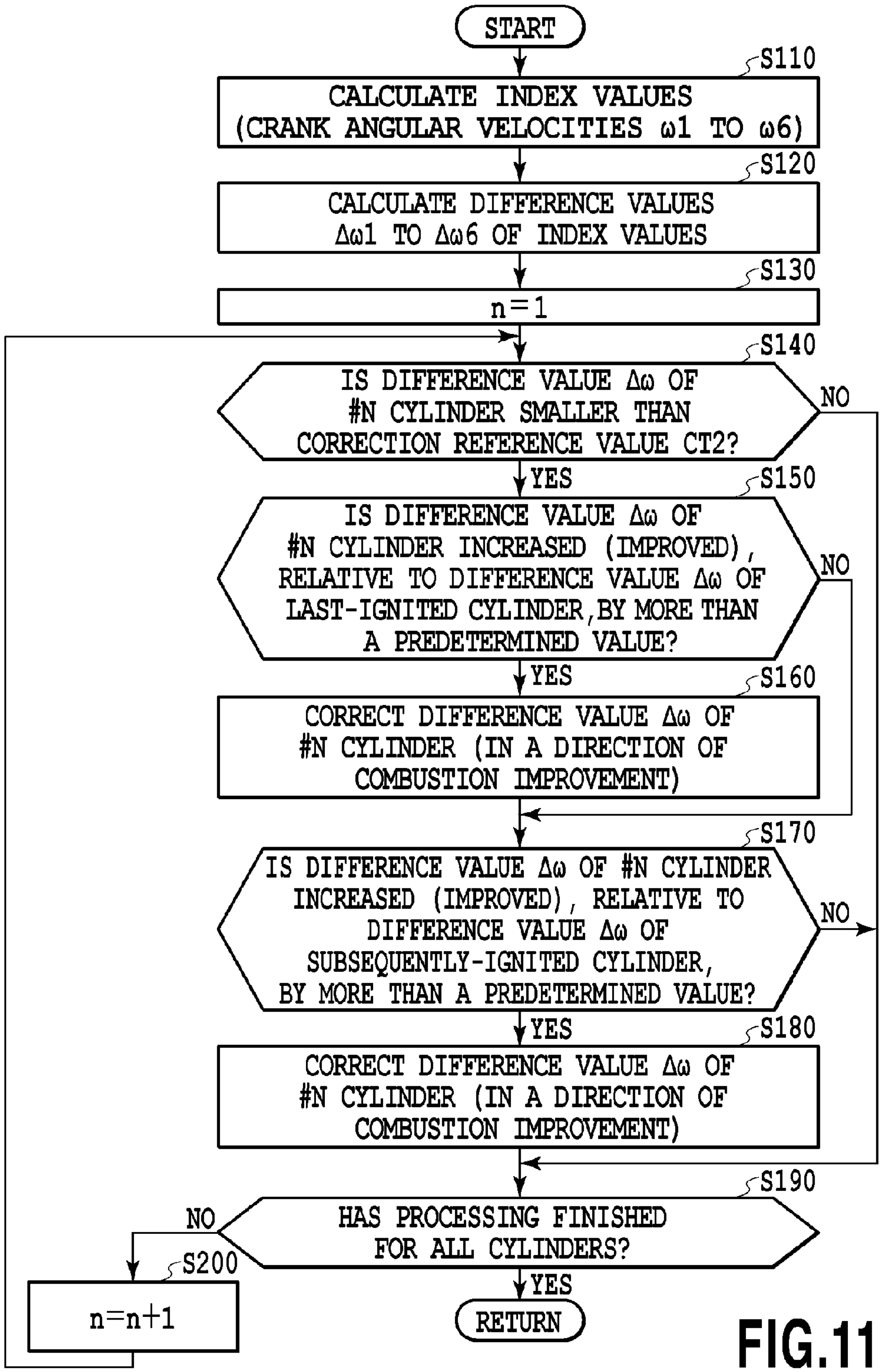
FIG. 11 is a flowchart showing a procedure for an inter-cylinder air-fuel ratio imbalance determination process according to a second embodiment.

An inter-cylinder air-fuel ratio variation abnormality detection process carried out according to the second embodiment will be described in detail. As shown in FIG. 11, first, the ECU 100 calculates, based on detection signals from the crank position sensor 22, the crank angular velocities ω1 to ω6 serving as index values for a variation of rotation, using the same projection 30 of the timing rotor TR as described above (S110). Then, the ECU 100 subtracts, from the crank angular velocity of the cylinder, the crank angular velocity of the opposite cylinder to calculate difference values Δω1 to Δω6 for the cylinders #1 to #6 (S120). The processes in steps S110 and S5120 are similar to the processes in steps S10 and S20 (FIG. 8) in the first embodiment described above. Now, the thus calculated difference values Δω1 to Δω6 are assumed to be as shown, for example, in FIG. 12.

Then, the ECU 110 initializes a cylinder counter n indicative of a cylinder of interest (S130), and determines whether the difference value Δω for the #n cylinder is smaller than a correction reference value CT2 (S140). In an example in FIG. 12, the difference value Δω1 for the #1 cylinder is larger than the correction reference value CT2, and thus the ECU 110 makes a negative determination and steps S150 to S180 are skipped. The ECU 110 then determines whether the processes are finished for all the cylinders (S190). In this case, the ECU 110 now makes a negative determination, and the cylinder counter n is incremented (S200). The ECU 100 then determines whether the difference value Δω2 for the #2 cylinder, which is the subsequently ignited cylinder, is smaller than the correction reference value CT2 (140).

Figure 12:
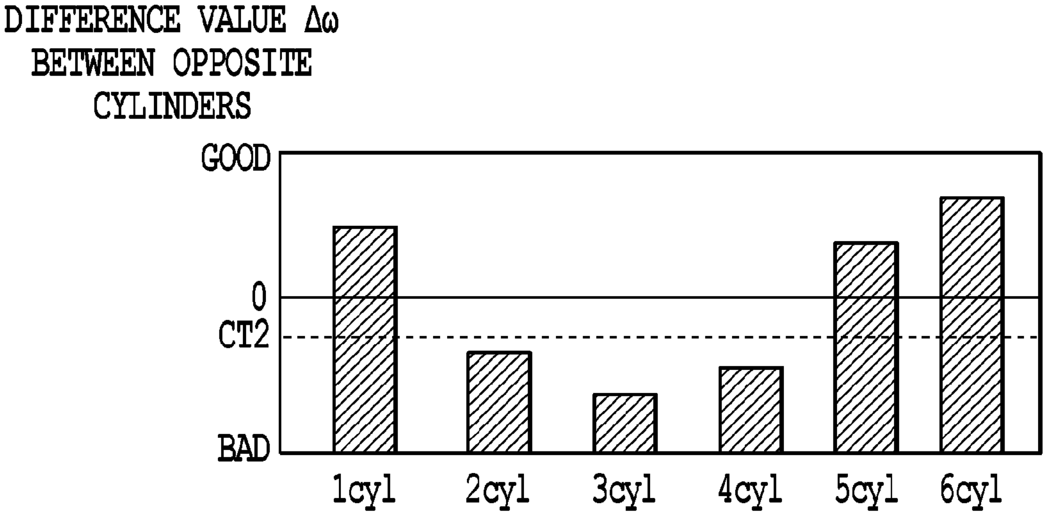
FIG. 12 is a graph showing the values of a difference in crank angular velocity between opposite cylinders calculated according to the second embodiment.

In the example in FIG. 12, the difference value Δω2 for the #2 cylinder, which is the cylinder of interest, is smaller than the correction reference value CT2. Therefore, the ECU 100 determines whether the difference value Δω2 for the #2 cylinder, which is the cylinder of interest, is increased (improved), by at least a predetermined value, than the difference value Δω1 for the last ignited cylinder (in this case, the #1 cylinder) (S150). If YES, the ECU 100 corrects the difference value Δω2 for the #2 cylinder in a direction of combustion improvement (S160). This correction amount is determined by referring to the correction amount map (FIG. 3) as is the case with the first embodiment. If NO in step S150, step S160 is skipped, and the correction of the difference value Δω2 for the #2 cylinder is omitted.

Then, the ECU 100 determines whether the difference value Δω2 for the #2 cylinder, which is the current cylinder of interest, is increased (improved), by at least a predetermined value, than the difference value Δω3 for the cylinder (in this case, the #3 cylinder) ignited subsequently to the #2 cylinder, which is the cylinder of interest (S170). If YES, the ECU 100 corrects the difference value Δω2 for the #2 cylinder in a direction of combustion improvement (S180). This correction amount is also determined by referring to the correction amount map (FIG. 3) as is the case with the first embodiment. If NO in step S170, step S180 is skipped, and the correction of the difference value Δω2 for the #2 cylinder is omitted.

Then, after a negative determination in step S190 and a change of the cylinder of interest in step S200, the processes in steps S140 to S180 are carried out using the #3 cylinder, which is "the worst cylinder", as the cylinder of interest. In this case, the difference value Δω3 for the #3 cylinder is smaller than the correction reference value CT2 (S140) but is not increased (improved) compared either to the difference value Δω2 for the last ignited cylinder (#2) (S150) or to the difference value Δω44 for the subsequently ignited cylinder (#4) (S150). Thus, both steps S160 and S180 are skipped, and the correction for the #3 cylinder is omitted.

These processes are sequentially carried out with the cylinder of interest changed by incrementing the cylinder counter n (S200) until the processes finish for all the cylinders (S190). Thus, the correction of the difference value Δω is performed on all the cylinders as necessary.

As a result of the above-described processes, according to the second embodiment, when the cylinder of interest is a cylinder for which the difference value Δωneeds to be corrected, that is, "the opposite cylinder" which is opposite to a cylinder belonging to the same bank as that of "the worst cylinder" and being different from "the worst cylinder", a correction process is carried out only on the cylinder of interest. When the cylinder of interest needs no correction, for example, when the cylinder of interest is "the worst cylinder", the correction process is skipped.

Thus, the second embodiment corrects the difference value Δω for the cylinder of interest in a direction of combustion improvement when the difference value Δω for the cylinder of interest is increased (improved), by at least the predetermined value, than the difference value Δω for any of the opposite cylinders that are opposite to the cylinders belonging to the same bank as that of the cylinder of interest and being other than the cylinder of interest. Therefore, the second embodiment can determine whether or not the difference value Δω for the cylinder of interest needs to be corrected regardless of the determination of whether or not the correction is needed for the other cylinders, while avoiding the correction for the worst cylinder. Consequently, the second embodiment can carry out a correction process for the opposite cylinders that are opposite to the cylinders belonging to the same bank as that of the worst cylinder and being other than the worst cylinder, independently of a correction process for the other cylinders. This allows the processing to be simplified.

The preferred embodiments of the present invention have been described in detail. However, the embodiments of the present invention are not limited to the above-described embodiments but include any variations, applications, and equivalents embraced in the concepts of the present invention specified by the claims. Therefore, the present invention should not be interpreted in a limited manner but is applicable to any other technique belonging to the scope of concepts of the present invention.

For example, the above-described embodiments determine the imbalance of the air-fuel ratio among the cylinders based on the difference among the index values (crank angular velocities ω) detected in all the sets of opposite cylinders.

However, the technical advantage of the present invention can be accomplished provided that at least one set of opposite cylinders is set to be a detection target.

Furthermore, to improve detection sensitivity for air-fuel ratio variation abnormality, the amount of fuel injected in a predetermined target cylinder may be actively or forcibly increased or reduced so as to detect the variation abnormality based on a variation of rotation after the increase or reduction. Preferably, in this case, the amount of injected fuel is forcibly increased or reduced by the same magnitude for a set of opposite cylinders or for all of a plurality of sets of cylinders.

The present invention is not limited the V6 engine but is applicable to an engine with a different number of cylinders or another type of engine with a plurality of banks, that is, a plurality of cylinder groups, for example, a horizontally opposed cylinder engine. Such an aspect also belongs to the scope of the present invention.

The scope of the following claims is to be accorded the broadest interpretation so as to encompass all such modifications and equivalent structures and functions.

What is claimed is:

1. An inter-cylinder air-fuel ratio variation abnormality detection apparatus for a multicylinder internal combustion engine having a plurality of cylinders connected to a common crank shaft and forming a plurality of banks, the apparatus comprising:

an imbalance determination unit determining imbalance of an air-fuel ratio among the cylinders based on a difference between index values correlated with crank angular velocities detected in a set of opposite cylinders belonging to different banks and having crank angles different from one another by 360°; and an air-fuel ratio feedback processing unit carrying out an air-fuel ratio feedback process for controlling an amount of injected fuel for each of the banks so as to make the air-fuel ratio equal to a predetermined target air-fuel ratio, wherein the apparatus further comprises a correction unit correcting, before determining the air-fuel ratio imbalance, the difference between the index values in a direction of combustion improvement for opposite cylinders that are opposite to cylinders belonging to a bank identical to a bank of a cylinder with an index value deviating most from a standard value among all the cylinders and being other than the cylinder with the most deviating index value.

2. The inter-cylinder air-fuel ratio variation abnormality detection apparatus for the multicylinder internal combustion engine according to claim 1, wherein:

a correction amount for the correction is changed in accordance with the index value of a cylinder which deviates most from the standard value among all the cylinders.

3. The inter-cylinder air-fuel ratio variation abnormality detection apparatus for the multicylinder internal combustion engine according to claim 2, wherein:

the correction amount for the correction increases consistently with an absolute value of the difference between the index values for a cylinder which deviates most from the standard value among all the cylinders.

* * * * *